(12) United States Patent
Liang

(10) Patent No.: US 11,082,806 B2
(45) Date of Patent: Aug. 3, 2021

(54) METHOD OF IDENTIFYING USER LOCATION, STORAGE MEDIUM AND ELECTRONIC DEVICE

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/725,850

(22) Filed: Dec. 23, 2019

(65) Prior Publication Data

US 2020/0137525 A1  Apr. 30, 2020

Related U.S. Application Data

(63) Continuation of application No. PCT/CN2017/091380, filed on Jun. 30, 2017.

(51) Int. Cl.
*H04W 24/00* (2009.01)
*H04W 4/029* (2018.01)
*H04W 24/08* (2009.01)

(52) U.S. Cl.
CPC ........... *H04W 4/029* (2018.02); *H04W 24/08* (2013.01)

(58) Field of Classification Search
None
See application file for complete search history.

(56) References Cited

U.S. PATENT DOCUMENTS

| | | | |
|---|---|---|---|
| 7,822,426 B1 | 10/2010 | Wuersch | |
| 9,413,837 B2* | 8/2016 | Vaccari | H04W 4/023 |
| 2011/0246469 A1 | 10/2011 | Yarvis et al. | |
| 2012/0108259 A1* | 5/2012 | Weiss | G06Q 30/0267 |
| | | | 455/456.1 |
| 2014/0287773 A1* | 9/2014 | Agerstam | H04W 48/16 |
| | | | 455/456.1 |

FOREIGN PATENT DOCUMENTS

| | | |
|---|---|---|
| CN | 101452259 A | 6/2009 |
| CN | 102667840 A | 9/2012 |
| CN | 104252527 A | 12/2014 |

(Continued)

OTHER PUBLICATIONS

European search report, EP17915273, dated Mar. 30, 2020 (9 pages).

(Continued)

*Primary Examiner* — Erika A Washington

(57) ABSTRACT

A user location identification method may include: clustering multiple geographic locations of a user acquired in advance to obtain a cluster center of each type of geographic locations, identifying a frequent location corresponding to each cluster center; and obtaining a current geographic location of the user; determining a cluster center matching the current geographic location, and using the frequent location corresponding to the matched cluster center as the current location of the user. The present application also provides a user location identification apparatus, a storage medium, and an electronic device.

16 Claims, 7 Drawing Sheets

(56) References Cited

FOREIGN PATENT DOCUMENTS

| CN | 104508573 A | 4/2015 |
|----|-------------|--------|
| CN | 105243396 A | 1/2016 |
| CN | 105847529 A | 8/2016 |
| CN | 106506705 A | 3/2017 |
| CN | 106547894 A | 3/2017 |
| CN | 106767835 A | 5/2017 |

OTHER PUBLICATIONS

Xin Cao et al, Mining significant semantic locations from GPS data, Proceedings of the VLDB Endowment; [ACM Digital Library], Assoc.of Computing Machinery, New York, NY, Sep. 1, 2010, pp. 1009-1020, vol. 3, No. 1-2.
Cavojsky Maros et al, Energy Efficient Trajectory Recording of Mobile Devices Using WiFi Scanning, UIC/ATC/SCALCOM/CBOCOM/IOP/SMARTWORL, Jul. 18 2016, pp. 1079-1085.
International search report issued in corresponding international application No. PCT/CN2017/091380, dated Jan. 24, 2018 (2 pages).
European new search report, EP17915273,dated Aug. 18, 2020 (8 pages).
First Office Action with English Translation from China patent office in a counterpart Chinese patent Application No. 201780090276.5,dated Oct. 19, 2020 (27pages).
Chinese Notification to Grant Patent Right with English Translation for Invention for CN Application 2017800902765 dated Apr. 8, 2021. (6 pages).
Indian Examination Report for IN Application 201917053615 dated Mar. 17, 2021. (5 pages).

* cited by examiner

METHOD OF IDENTIFYING USER LOCATION, STORAGE MEDIUM AND ELECTRONIC DEVICE

CROSS-REFERENCE TO RELATED APPLICATION(S)

The present application is a continuation application of International Patent Application No. PCT/CN2017/091380, filed on Jun. 30, 2017, the entire contents of which are hereby incorporated by reference in their entireties.

TECHNICAL FIELD

The described embodiments relate to telecommunication, and in particular, to a method of identifying user location, a storage medium and an electronic device.

BACKGROUND

As hardware of smart terminals develops continuously, the hardware may not be a bottle neck to stagnate development of the smart terminals any more. An increasing number of manufacturers of the smart terminals has redirected from pursuing high configuration of the hardware to improving a standard of software services. One of critical services is to identify a user location, and services based on the user location may be supplied. For example, by identifying the user location, it may be acknowledged if the user is at home or in an office, such that services, such as terminal mode intelligent switching, may be provided.

SUMMARY

According to a first aspect, a method of identifying user location may be provided and include: clustering a plurality of geographic locations of a user acquired in advance, and obtaining a cluster center of each type of geographic locations; identifying a frequent location corresponding to each cluster center; acquiring a current geographic location of the user; and determining the cluster center matching the current geographic location, and taking the frequent location corresponding to the cluster center matching the current geographic location as a current location of the user.

According to a second aspect, a non-transitory storage medium may be provided. The non-transitory storage medium may have one or more instruction stored therein. The one or more instruction is executed by a processor to perform operations of: acquiring a current geographic location of the user; determining a cluster center matching the current geographic location according to a pre-stored mapping relation; and taking the frequent location corresponding to the matched cluster center as a current location of the user. The pre-stored mapping relation includes a plurality of geographic locations of the user, cluster centers corresponding to the plurality of geographic locations, and frequent locations corresponding to the plurality of geographic locations. The pre-stored mapping relation is obtained by acquiring the plurality of geographic locations of the user, clustering the plurality of geographic locations of the user, obtaining a cluster center of each type of geographic locations, and identifying a frequent location corresponding to each cluster center.

According to a third aspect, an electronic device may be provided and include a processor, a non-transitory memory, a display screen, and a control circuit. The processor is electrically connected to the non-transitory memory, the display screen, and the control circuit. The non-transitory memory is arranged to store an instruction and data. The display screen is arranged to display information. The control circuit is arranged to control the display screen to display information. The processor is arranged to perform operations of: clustering a plurality of geographic locations of a user acquired in advance, and obtaining a cluster center of each type of geographic locations; identifying a frequent location corresponding to each cluster center by determining a state of the electronic device; acquiring a current geographic location of the user; and determining the cluster center matching the current geographic location, and taking the frequent location corresponding to the matched cluster center as a current location of the user.

BRIEF DESCRIPTION OF DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1A:
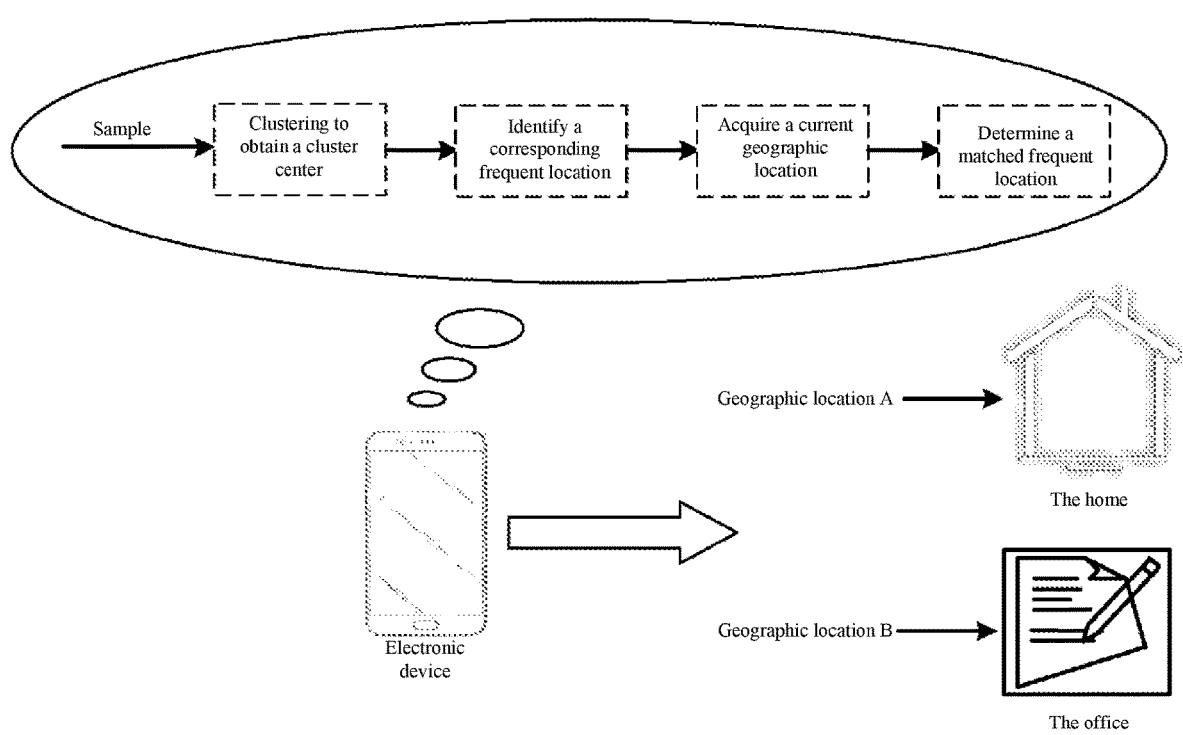
FIG. 1A shows an application scenario of a method of identifying user location according to an embodiment of the present disclosure.

Technical solutions of embodiments of the present disclosure may be described clearly and comprehensively by referring to the drawings. Apparently, described embodiments are only a part of, but not all of, the embodiments. Based on the embodiments of the present disclosure, all other embodiments obtained by ordinary skilled in the related art without any creative effort may be within the scope of the present disclosure.

In the related art, a method of learning a life style of a user in order to identify a frequent location (such as the home or an office) may be achieved through network interaction. For example, collected data indicating the life style of the user may be uploaded to a server through a network. The server may analyze and learn based on the collected data to identify the location of the user. During the network interaction, an issue of uploading sensitive information of the user without authorization may be involved. To some extent, the user may concern about security, such that the user may refuse to use some services supplied based on their locations.

According to a first aspect, a method of identifying user location may be provided and include: clustering a plurality of geographic locations of a user acquired in advance, and obtaining a cluster center of each type of geographic locations; identifying a frequent location corresponding to each cluster center; acquiring a current geographic location of the user; and determining the cluster center matching the current geographic location, and taking the frequent location corresponding to the cluster center matching the current geographic location as a current location of the user.

In some embodiments, the clustering a plurality of geographic locations of a user acquired in advance, and the obtaining a cluster center of each type of geographic locations includes: setting the plurality of geographic locations to be a sample group, selecting a predefined number of geographic locations randomly from the sample group to be initial cluster centers for clustering by applying a K-means algorithm, and obtaining the cluster center of each type of geographic locations.

In some embodiments, the identifying a frequent location corresponding to each cluster center includes: within a predefined period of sample collection, counting the number of dormancies of an electronic device of the user meeting a predefined dormant duration at a location matching each cluster center; and identifying the frequent location corresponding to each cluster center based on the counted number of dormancies.

In some embodiments, the determining the cluster center matching the current geographic location includes: determining a distance between the current geographic location and each cluster center, and taking the cluster center having a shortest distance to the current geographic location as the cluster center matching the current geographic location.

In some embodiments, after the obtaining a cluster center of each type of geographic locations, the method further includes: acquiring a basic service set identification (BSSID) of a wireless network to which the electronic device of the user is connected at each of the plurality of geographic locations; determining the cluster center matching each of the plurality of geographic locations; and adding the BSSID correspondingly into a location set corresponding to the cluster center matching each of the plurality of geographic locations.

In some embodiments, after the adding the BSSID correspondingly into a location set corresponding to the cluster center matching each of the plurality of geographic locations, the method further includes: within the predefined period of sample collection, counting the number of dormancies of the electronic device meeting the predefined dormant duration at a location matching each location set; and identifying the frequent location corresponding to each location set based on the counted number of dormancies.

In some embodiments, after identifying the frequent location corresponding to each location set based on the counted number of dormancies, the method further includes: acquiring the BSSID of the wireless network to which the user is currently connected; and determining the location set matching the BSSID of the wireless network to which the user is currently connected, and taking the frequent location corresponding to the matched location set as the current location of the user.

According to a second aspect, a non-transitory storage medium may be provided. The non-transitory storage medium may have one or more instruction stored therein. The one or more instruction is executed by a processor to perform operations of: acquiring a current geographic location of the user; determining a cluster center matching the current geographic location according to a pre-stored mapping relation; and taking the frequent location corresponding to the matched cluster center as a current location of the user. The pre-stored mapping relation includes a plurality of geographic locations of the user, cluster centers corresponding to the plurality of geographic locations, and frequent locations corresponding to the plurality of geographic locations. The pre-stored mapping relation is obtained by acquiring the plurality of geographic locations of the user, clustering the plurality of geographic locations of the user, obtaining a cluster center of each type of geographic locations, and identifying a frequent location corresponding to each cluster center.

In some embodiments, the frequent location corresponding to each cluster center is identified by: counting the number of dormancies of an electronic device of the user having dormant duration meeting a predefined value at a location matching each cluster center within a predefined period of sample collection; and identifying the frequent location corresponding to each cluster center based on the counted number of dormancies.

In some embodiments, the one or more instruction is further executed by the processor to perform operations of: acquiring a BSSID of a wireless to which the electronic device is connected at each of the plurality of geographic locations; determining the cluster center matching each of the plurality of geographic locations; and adding the BSSID correspondingly into a location set corresponding to the matched cluster center.

In some embodiments, the one or more instruction is further executed by the processor to perform operations of: counting the number of dormancies of the electronic device having the dormant duration meeting the predefined value at a location matching each location set, within the predefined period of sample collection; and identifying the frequent location corresponding to each location set based on the counted number of dormancies.

In some embodiments, the one or more instruction is further executed by the processor to perform operations of: acquiring the BSSID of the wireless network to which the user is currently connected; and determining the location set matching the BSSID of the wireless network to which the user is currently connected, and taking the frequent location corresponding to the matched location set as the current location of the user.

According to a third aspect, an electronic device may be provided and include a processor, a non-transitory memory, a display screen, and a control circuit. The processor is electrically connected to the non-transitory memory, the display screen, and the control circuit. The non-transitory memory is arranged to store an instruction and data. The display screen is arranged to display information. The control circuit is arranged to control the display screen to display information. The processor is arranged to perform operations of: clustering a plurality of geographic locations of a user acquired in advance, and obtaining a cluster center of each type of geographic locations; identifying a frequent location corresponding to each cluster center by determining a state of the electronic device; acquiring a current geographic location of the user; and determining the cluster center matching the current geographic location, and taking the frequent location corresponding to the matched cluster center as a current location of the user.

In some embodiments, during the clustering a plurality of geographic locations of a user acquired in advance, and obtaining a cluster center of each type of geographic locations, the processor is further arranged to use the plurality of geographic locations as a sample group, and select a predefined number of geographic locations from the sample group randomly to be initial cluster centers for clustering by applying a K-means algorithm, such that the cluster center of each type of geographic locations is obtained.

In some embodiments, during the clustering a plurality of geographic locations of a user acquired in advance, and obtaining a cluster center of each type of geographic locations, the processor is further arranged to eliminate a geographic location sample when a distance between the geographic location sample and any cluster center is greater than a predefined value.

In some embodiments, during the identifying a frequent location corresponding to each cluster center, the processor is further arranged to: count the number of dormancies of the electronic device of the user meeting predefined dormant duration at a location matching each cluster center, within a predefined period of sample collection; and identify the frequent location corresponding to each cluster center based on the counted number of dormancies.

In some embodiments, during the determining the cluster center matching the current geographic location, the processor is further arranged to determine a distance between the current geographic location and each cluster center, and take the cluster center having a shortest distance to the current geographic location as the cluster center matching the current geographic location.

In some embodiments, after the obtaining a cluster center of each type of geographic locations, the processor is further arranged to: acquire the BSSID of the wireless network to which the electronic device is connected at each of the plurality of geographic locations; determine the cluster center matching each of the plurality of geographic locations; and add the BSSID correspondingly into a location set corresponding to the matched cluster center.

In some embodiments, after adding the BSSID correspondingly into the location set corresponding to the matched cluster center, the processor is further arranged to: count the number of dormancies of the electronic device meeting the predefined dormant duration at a location matching each location set, within the predefined period of sample collection; and identify the frequent location corresponding to each location set based on the counted number of dormancies.

In some embodiments, after identifying the frequent location corresponding to each location set based on the counted number of dormancies, the processor is further arranged to: acquire the BSSID of the wireless network to which the user is currently connected; and determine the location set matching the BSSID of the wireless network to which the user is currently connected, and take the frequent location corresponding to the matched location set as the current location of the user.

According to a fourth aspect, an apparatus to identify user location is provided. The apparatus includes a clustering module, a first identification module, a first acquisition module, and a first determination module. The clustering module is arranged to cluster a plurality of geographic locations of a user acquired in advance to obtain a cluster center of each type of geographic locations. The first identification module is arranged to identify a frequent location corresponding to each cluster center. The first acquisition module is arranged to acquire a current geographic location of the user. The first determination module is arranged to determine the cluster center matching the current geographic location, and take the frequent location corresponding to the matched cluster center as a current location of the user.

According to a fifth aspect, an electronic device may be provided and include a processor, a non-transitory memory, a display screen, and a control circuit. The processor is electrically connected to the non-transitory memory, the display screen, and the control circuit. The non-transitory memory is arranged to store an instruction and data. The display screen is arranged to display information. The control circuit is arranged to control the display screen to display information. The processor is arranged to perform operations of: clustering a plurality of geographic locations of a user acquired in advance, and obtaining a cluster center of each type of geographic locations; identifying a frequent location corresponding to each cluster center; acquiring a current geographic location of the user; and determining the cluster center matching the current geographic location, and taking the frequent location corresponding to the matched cluster center as a current location of the user.

The present embodiment may be described from a view of an apparatus of identifying user location. A location may be abstract, and may refer to a name of place defined by a user, such as the home, the office, the dinner place, and the like. A geographic location may refer to a physical position of the user, and may be represented by a spatial coordinate, or longitude and latitude, or the like. The apparatus of identifying user location may refer to determine the location of the user by identifying the geographic location of the user. The apparatus of identifying user location may be integrated into an electronic device, such as a smart phone, a tablet computer, or the like. As shown in FIG. 1A, an electronic device may cluster a plurality of geographic locations (a sample group) of a user acquired in advance to obtain a cluster center of each type of geographic locations. A frequent location corresponding to each cluster center may be identified. After acquiring a current geographic location of the user, a cluster center matching the current location may be determined. A frequent location corresponding to the cluster center matching the current geographic location may be determined to be the current location of the user. For example, the acquired current geographic location of the user is a geographic location A, and a frequent location matching the geographic location A is "the home", the current location of the user may be determined to be at home. Alternatively, the acquired current geographic location of the user is a geographic location B, and a frequent location matching the geographic location B is "office", the current location of the user is determined to be in the office. After determining the location of the user, the electronic device may perform intelligent switching of some modes. For example, when the user is identified to be in the office, the electronic device may be set to be in a normal mode. When the user is identified to be at home, the electronic device may be switched into a vibration or a silent mode, such that the user may not be disturbed.

Figure 1B:
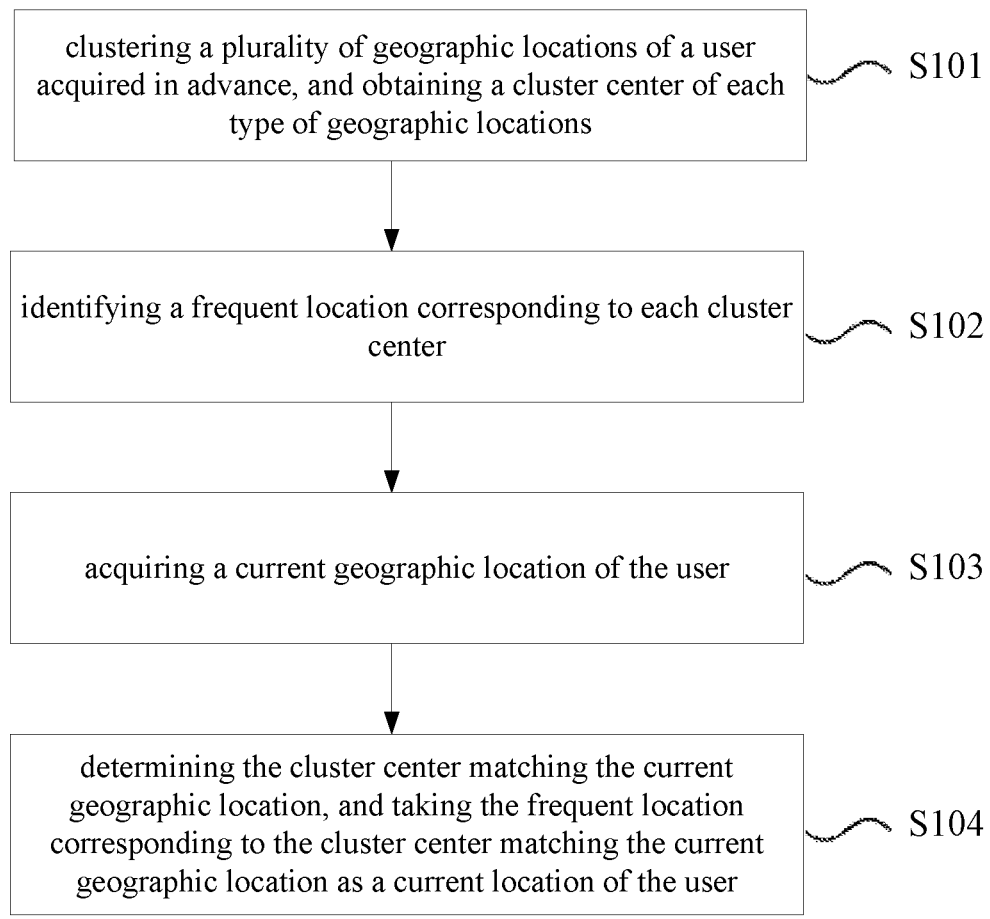
FIG. 1B is a flow chart of a method of identifying user location according to an embodiment of the present disclosure.

In some embodiments, a method of identifying user location may be provided, as shown in FIG. 1B. FIG. 1B is a flow chart of the method of identifying user location according to an embodiment of the present disclosure. The method of identifying user location may include following operations.

S101, a plurality of geographic locations of a user acquired in advance may be clustered, and a cluster center of each type of geographic location may be obtained.

In the present embodiment, the geographic location may be represented by longitude and latitude or a spatial coordinate. The geographic location of the user may be acquired from the user's electronic device. For example, the geographic location may be acquired through a software development kit (SDK) of a map application installed in the electronic device, or acquired through an application programming interface (API) of a location-related application (such as a social application, life service applications, or the like) provided by a system. Means of acquiring the geographic location may not be limited herein.

A cluster center may represent common feature information of a group of samples, based on a certain type of information.

A plurality of geographic locations of the user may be collected in advance, and may be set as a sample group, and the plurality of geographic locations may be geographic location samples. For example, the geographic location samples may include $l_1, l_2, \ldots, l_n$, and n is a positive integer. When the geographic location samples are represented by longitude and latitude, any one of the geographic location samples $l_i$ may be composed of a longitude value and a latitude value; i is a positive integer, such as $l_i=(lon_i, lat_i)$. When the geographic location samples are represented by a spatial coordinate, any one of the geographic location samples may be composed of a value x of a horizontal axis, a value y of a longitudinal axis, and a value z of a vertical axis, such as $l_i=(x_i, y_i, z_i)$.

To be specific, the geographic location samples may be clustered by a k-means algorithm.

Firstly, j location data may be selected from the geographic location samples randomly and set to be initial cluster centers, $u_1, u_2, \ldots, u_j$, j is a positive integer, and j is less than n. A value of j may be determined by the number of types required to be clustered. For example, when the geographic location samples are required to be clustered into two types, then j may be equal to 2. When the geographic location samples are required to be clustered into three types, j may be equal to 3.

Secondly, each of the geographic location samples may be classified into a corresponding cluster based on Formula I:

$$c_i = \arg\min_j \|l_i - u_j\|^2 \quad \text{(Formula I)}$$

Formula I calculates a distance between each of the geographic location samples and each of the cluster centers. A geographic location sample may be sorted into a cluster having the cluster center closest to the geographic location.

Thirdly, each cluster center may be recalculated based on Formula II:

$$\mu_j = \frac{\sum_{i=1}^{n} 1\{c_i = j\} l_i}{\sum_{i=1}^{n} 1\{c_i = j\}} \quad \text{(Formula II)}$$

Formula II calculates a mean value of the spatial coordinates of all geographic locations (geographic location samples) included in each cluster, and the mean value of the spatial coordinates may be taken as a new cluster center.

Fourthly, the second and the third operation may be performed repeatedly till the cluster center does not vary. J cluster centers may be obtained, and the geographic location samples may be divided into j clusters having the j cluster centers.

Fifthly, a geographic location sample of which the distance from the cluster center greater than a predefined value may be eliminated from the j cluster centers, then the second, the third, and the fourth operations may be repeatedly performed, and the j cluster centers, $u_1, u_2, \ldots, u_j$, may be obtained, the predefined value may be determined based on actual requirements. In such a way, a geographic location far away from any other geographic locations may be excluded in further statistics, and the excluded geographic location may not be a frequent location of the user.

To be noted that, the above description illustrates clustering the geographic location samples based on the K-means clustering algorithm only. In an actual operation, other clustering algorithms may be applied to cluster the geographic location samples, such as a K-medoids clustering algorithm, a Clara clustering algorithm, and the like. The clustering algorithm may not be limited herein.

S102, a frequent location corresponding to each cluster center may be identified.

The frequent location may be a location at which the user often lives and works, such as the home, an office, or the like. In an actual operation, based on the life style of the user (for example, a habit of using the electronic device), the frequent location corresponding to each cluster center may be identified. Each cluster center may correspond to one frequent location. For example, there may be two frequent locations, the j as mentioned in the above may be equal to 2, and two cluster centers, $u_1$ and $u_2$ may be obtained from the S101.

S103, a current geographic location of the user may be acquired.

The current geographic location of the user may be a real-time geographic location of the user, and may be acquired from the electronic device of the user.

S104, the cluster center matching the current geographic location may be determined, and the frequent location corresponding to the cluster center matching the current geographic location may be taken as the current location of the user.

To be specific, a distance between the current geographic location and each cluster center may be calculated. The cluster center having a shortest distance from the current geographic location may be taken as the cluster center matching the current geographic location. After acquiring the cluster center matching the current geographic location, the frequent location corresponding to the cluster center matching the current geographic location may be taken as the current location of the user.

According to the above embodiment, in an electronic device, a plurality of geographic locations acquired in advance may be clustered to obtain a cluster center of each type of geographic locations. A frequent location corresponding to each cluster center may be identified. After acquiring a current geographic location of a user, the cluster center matching the current geographic location may be determined, and the frequent location corresponding to the cluster center matching the current geographic location may be taken as the current location of the user. According to the present embodiment, by clustering the geographic locations, the electronic device may learn geographic location samples and the frequent locations. Based on the learning, the frequent location at which the user is currently located may be identified. The entire learning and identification processes may be performed locally in the electronic device without interaction with a network. Therefore, upload of sensitive information of the user without authorization may not be an issue, and security concerns of the user may be reduced. The identified location of the user may provide an effective reference for decisions of location-based intelligent services.

Figure 2:
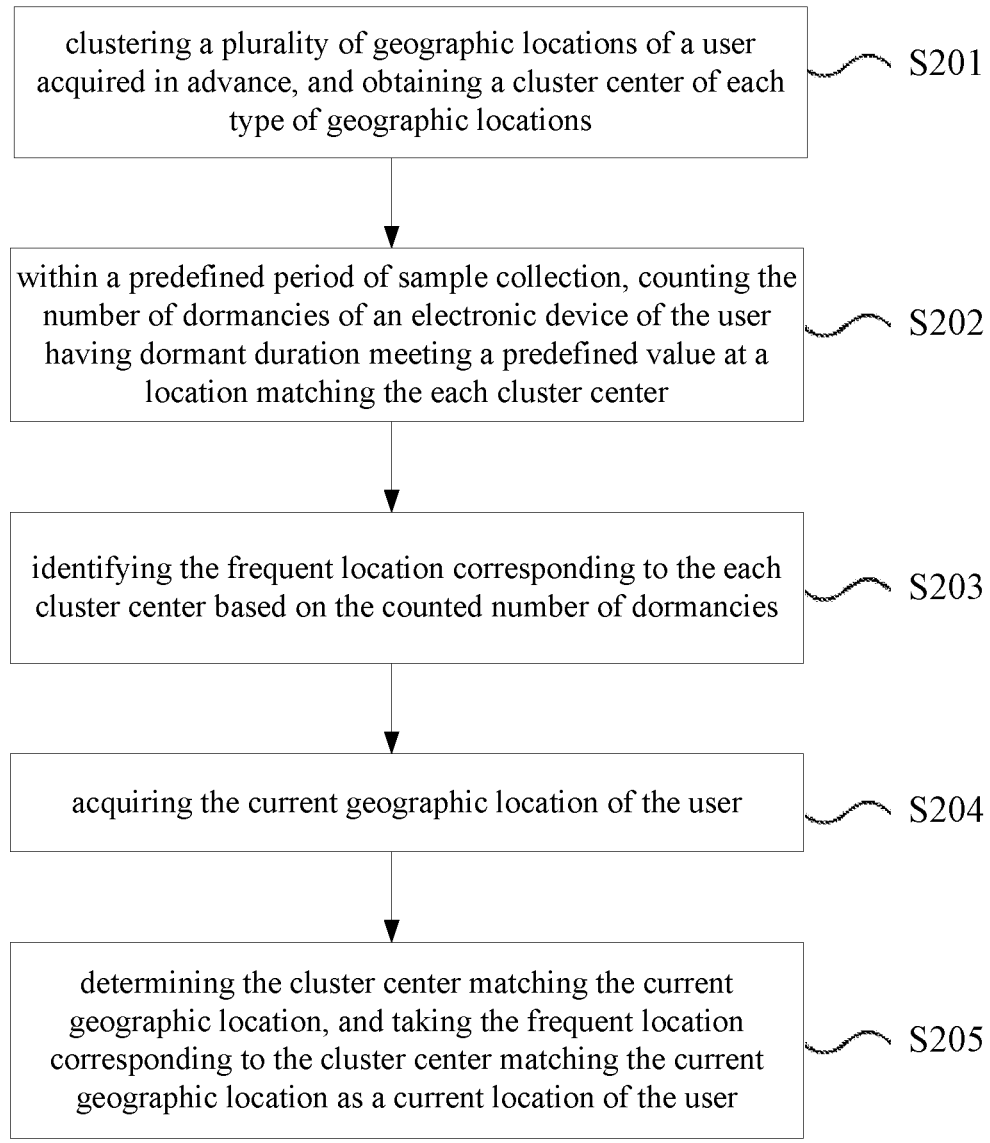
FIG. 2 is another flow chart of the method of identifying user location according to an embodiment of the present disclosure.

The method of identifying user location may further be illustrated by referring to two following embodiments on the basis the above-mentioned embodiment. As shown in FIG. 2, the present embodiment may illustrate identification of the frequent location at which the user is currently located based on the current geographic location of the user. The present embodiment may include following operations.

S201, the plurality of geographic locations acquired in advance may be clustered, and the cluster center of each type of geographic locations may be obtained.

The clustering algorithm may be selected from the group consisting of the K-means clustering algorithm, the K-medoids clustering algorithm, and the Clara clustering algorithm, the clustering algorithm may not be limited herein. In the present embodiment, the frequent locations to be identified as the home and the office of the user may be taken as an example. According to the S201, two cluster centers, $u_1$ and $u_2$ may be obtained.

S202, within the predefined period of sample collection, counting the number of dormancies of the electronic device of the user meeting predefined dormant duration at a location matching each cluster center.

The predefined period of sample collection may be defined by the user according to actual demands, for example, the period may be defined to be a week, a month, or the like. According to the habit of using the electronic device of a large number of users, when the user is at home, the electronic device may not be in use for a relatively long period of time (when the user is at rest), and the electronic device may be in a dormant state. When the user is at office, due to work requirements, the electronic device may be frequently used, and may not have relatively long dormant duration. For example, when the user is at home, the electronic device may have a 6 to 7 hours dormancy per day, and when the user is at office, the electronic device may barely have the dormancy for over 6 hours.

Therefore, the number of dormancies of the electronic device meeting predefined dormant duration at various locations may be counted in order to identify the frequent location corresponding to each of the various locations. The counting may be performed according to Formula III.

$$J_j = \Sigma_{i=1}^{sampleDays} 1\{t_i^{u_j} \geq T_{thresh}\}$$ (Formula III)

j=1, 2. sampleDays represents the period of sample collection, the period of sample collection may be 7 days, 10 days, 1 month, or the like, and will not be limited herein. $t_i^{u_j}$ represents consecutive dormant duration (the consecutive dormant duration may be acquired by counting consecutive duration of screen-off) of the electronic device at the location matching the cluster center $u_j$ on Day i within the period of sample collection. When the consecutive dormant duration of the electronic device on the Day i is longer than or equal to a predefined duration $T_{thresh}$ at the location matching the cluster center $u_j$, a counter $J_j$ may increase by 1. According to the Formula III, the number of dormancies of the electronic device meeting the predefined dormant duration at the location matching the cluster center $u_j$ may be summed to obtain the $J_j$. When the $J_j$ reaches a maximum, the frequent location corresponding to the cluster center $u_j$ may be home. In the present embodiment, the maximum $J_j$ may refer to the number of days of the sample collection. For example, the period of sample collection is 10 days, and the user may have a 6 hour rest per day, then the maximum $J_j$ may be equal to 10. The predefined duration may be determined according to an actual routine rest of the user, such as 6 hours, 8 hours, or the like.

S203, based on the counted number of dormancies, the frequent location corresponding to each cluster center may be identified.

Taking the home and the office as the example, when the period of sample collection is 7 days, $J_1$ may be counted to be 7 at the location matching the cluster center $u_1$ (that means the number of dormancies of the electronic device having the predefined dormant duration greater than or equal to the predefined value at the location matching the cluster center $u_1$ may be accumulated to reach 7), and $J_2$ may be counted to be 0 at the location matching the cluster center $u_2$ (that means the number of dormancies of the electronic device having the predefined dormant duration greater than or equal to the predefined value at the location matching the cluster center $u_2$ may be 0). It may indicate the frequent location corresponding to $u_1$ is the home, and the frequent location corresponding to $u_2$ is the office.

S204, the current geographic location of the user may be acquired.

The location which may be represented by longitude and latitude, a spatial coordinate, or the like may be acquired.

S205, the cluster center matching the current geographic location may be determined, and the frequent location corresponding to the cluster center matching the current geographic location may be taken as the current location of the user.

To be specific, a distance between the current geographic location and each cluster center may be calculated. The cluster center having a shortest distance to the current geographic location may be taken as the cluster center matching the current geographic location. After acquiring the cluster center matching the current geographic location, the frequent location corresponding to the cluster center matching the current geographic location may be taken as the current location of the user.

According to the above embodiment, in an electronic device, a plurality of geographic locations acquired in advance may be clustered to obtain a cluster center of each type of geographic locations. A frequent location corresponding to each cluster center may be identified. After acquiring a current geographic location of a user, the cluster center matching the current geographic location may be determined, and the frequent location corresponding to the cluster center matching the current geographic location may be taken as the current location of the user. According to the present embodiment, by clustering the geographic locations, the electronic device may learn geographic location samples and the frequent locations. Based on the learning, the frequent location at which the user is currently located may be identified. The entire learning and identification processes may be performed locally in the electronic device without interaction with a network. Therefore, upload of sensitive information of the user without authorization may not be an issue, and security concerns of the user may be reduced. The identified location of the user may provide an effective reference for decisions of location-based intelligent services.

Figure 3:
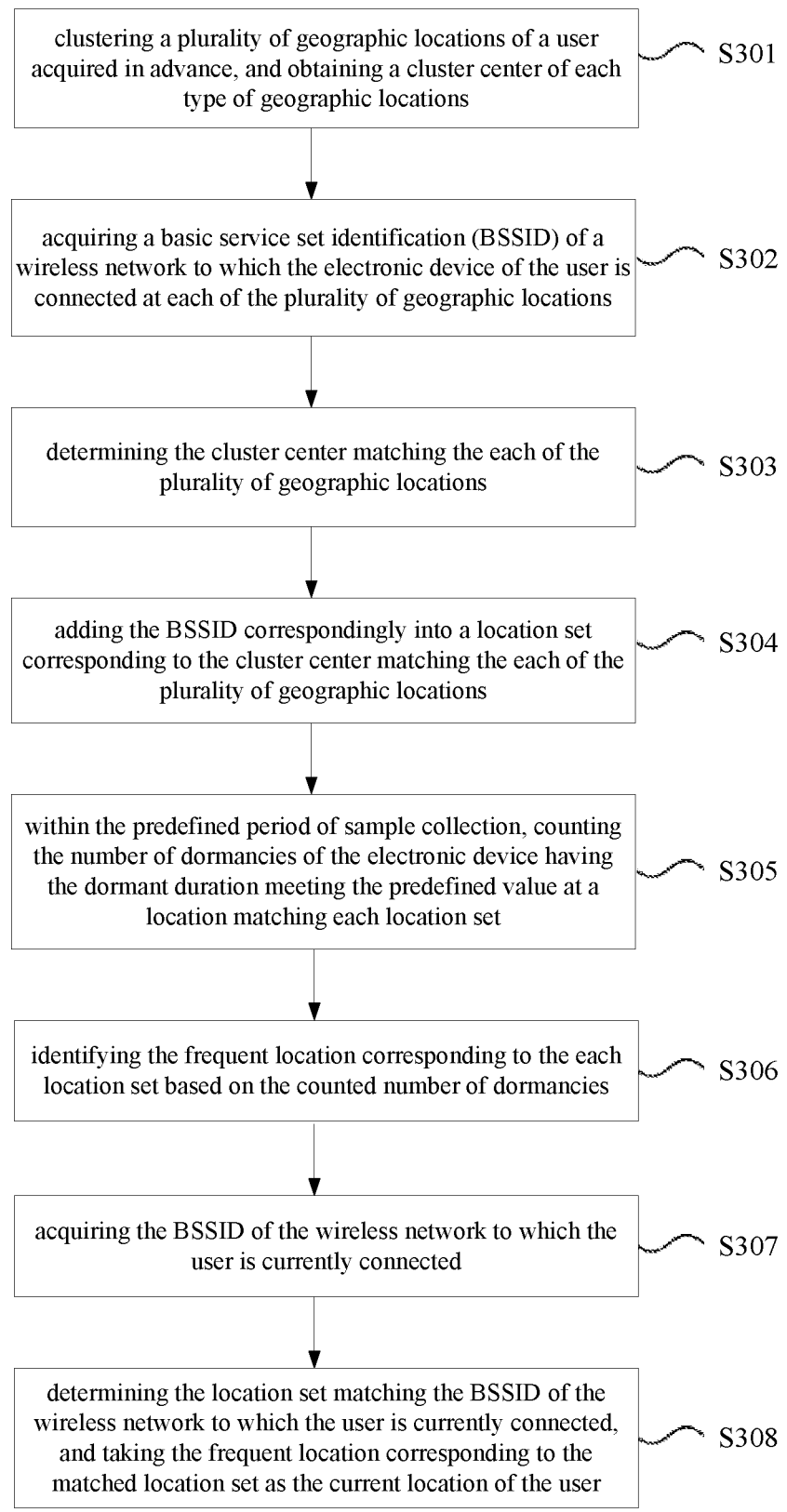
FIG. 3 is still another flow chart of the method of identifying user location according to an embodiment of the present disclosure.

The above-mentioned embodiment may illustrate the method of identifying the frequent location at which the user is currently located based on the current geographic location of the user. A following embodiment may illustrate the method of identifying the frequent location at which the user is currently located based on the basic service set identity (BSSID) of a wireless network to which the user is currently connected. As shown in FIG. 3, the method may include following operations.

S301, the plurality of geographic locations acquired in advance may be clustered, and the cluster center of each type of geographic locations may be obtained.

The clustering algorithm may be selected from the group consisting of the K-means clustering algorithm, the K-medoids clustering algorithm, and the Clara clustering algorithm. The clustering algorithm may not be limited herein. In the present embodiment, the frequent locations to be identified as the home and the office of the user may be used as an example. According to the S301, two cluster centers, to $u_1$ and $u_2$ may be obtained.

S302, a BSSID of a wireless network to which the user's electronic device is connected at each of the plurality of geographic locations may be acquired.

The basic service set identity (BSSID) may be a route media access control (MAC) address of the wireless network, and different wireless networks may have different BSSIDs.

S303, the cluster center matching each geographic location may be determined.

A distance between each cluster center and each geographic location may be determined, and the cluster center having a shortest distance to a geographic location may be taken as the cluster center matching the geographic location.

S304, the BSSID may be correspondingly added into a location set corresponding to the cluster center matching the current geographic location.

Each cluster center may correspond to a location set. Initially, each location set may be empty. From S302 to S304, the BSSID of the wireless network may be combined with the cluster center. When the user's electronic device is connected to one wireless network, the geographic location of the user may be acquired. When the geographic location of the user matches one cluster center, the BSSID of the one wireless network may be added into the location set corresponding to the one cluster center. By performing S304, a location set $w_1$ corresponding to the cluster center $u_1$ and a location set $u_2$ corresponding to the cluster center $u_2$ may be obtained, and $w_1 = \{BSSID_{p1}, BSSID_{p2}, \ldots, BSSID_{pm}\}$, $w_2 = \{BSSID_{q1}, BSSID_{q2}, \ldots, BSSID_{qm}\}$, m is a positive integer. As the user uses the electronic device continuously, the location sets $w_1$ and $w_2$ may be expanded continuously.

S305, within the predefined period of sample collection, the number of dormancies of the user's electronic device meeting predefined dormant duration at a location matching each location set may be counted.

The predefined period of sample collection may be determined by the user based on actual demands, such as a week, a month, or the like. According to the habit of using the electronic device of a large number of users, when the user is at home, the electronic device may not be in use for a relatively long period of time (when the user is at rest), and the electronic device may be in the dormant state. When the user is at office, due to work requirements, the electronic device may be frequently used, and may not have relatively long dormant duration. For example, when the user is at home, the electronic device may have a 6 to 7 hours dormancy per day, and when the user is at office, the electronic device may barely have the dormancy for over 6 hours.

Therefore, the number of dormancies of the electronic device meeting predefined dormant duration at various locations may be counted in order to identify frequent locations corresponding to the various locations. The counting may be performed based on Formula IV.

$$J_j = \Sigma_{i=1}^{sampleDays} 1\{t_i^{wj} \geq T_{thresh}\}$$ (Formula IV)

j=1, 2. sampleDays represents the period of sample collection, the period of sample collection may be 7 days, 10 days, 1 month, or the like, and will not be limited herein. $t_i^{wj}$ represents a consecutive dormant duration (the consecutive dormant duration may be acquired by counting consecutive duration of screen-off) of the electronic device at the location matching the location set $w_j$ on Day i within the period of sample collection. When the consecutive dormant duration of the electronic device on the Day i is longer than or equal to a predefined duration $T_{thresh}$ at the location matching the location set $w_j$, a counter $J_j$ may increase by 1. According to the Formula III, the number of dormancies of the electronic device meeting the predefined dormant duration at the location matching the location set $w_j$ may be summed to obtain the $J_j$. When the $J_j$ reaches a maximum, the frequent location corresponding to the location set $w_j$ may be home. The predefined duration may be determined according to an actual routine rest of the user, such as 6 hours, 8 hours, or the like.

S306, based on the counted number of dormancies, the frequent location corresponding to each location set may be identified.

Taking the home and the office as the example, when the period of sample collection is 7 days, $J_1$ may be counted to be 7 at the location matching the location set $w_1$ (that means the number of dormancies of the electronic device having the predefined dormant duration greater than or equal to the predefined value at the location matching the location set $w_1$ may be accumulated to reach 7), and $J_2$ may be counted to be 0 at the location matching the location set $w_2$ (that means the number of dormancies of the electronic device having the predefined dormant duration greater than or equal to the predefined value at the location matching the location set $w_2$ may be 0). It may indicate the frequent location corresponding to the location set $w_1$ is the home, and the frequent location corresponding to the location set $w_2$ is the office.

S307, the BSSID of the wireless network to which the user is connected may be acquired.

S308, the location set matching the BSSID of the wireless network to which the user is connected may be determined, and the frequent location corresponding to the location set matching the BSSID of the wireless network to which the user is connected may be taken as the current location of the user.

That is to determine which location set the BSSID of the wireless network connected to the user may belong to, and the frequent location corresponding to the location set to which the BSSID belongs may be taken as the current location of the user.

According to the above embodiment, in an electronic device, a plurality of geographic locations acquired in advance may be clustered to obtain a cluster center of each type of geographic locations, and a location set corresponding to each cluster center may be generated. A frequent location corresponding to each location center may be identified. After acquiring a BSSID of a wireless network to which the user is currently connected, the location set matching the BSSID of the wireless network to which the user is currently connected may be determined, and the frequent location corresponding to the matched location set may be taken as the current location of the user. According to the present embodiment, by clustering the geographic locations, the electronic device may learn the BSSID of the samples and the frequent locations. Based on the learning, the frequent location at which the user is currently located may be identified. The entire learning and identification processes may be performed locally in the electronic device without interaction with a network. Therefore, upload of sensitive information of the user without authorization may not be an issue, and security concerns of the user may be reduced. The identified location of the user may provide an effective reference for decisions of location-based intelligent services.

The above-mentioned two embodiments may illustrate identifying the frequent location of the user based on the current geographic location and identifying the frequent location of the user based on the BSSID of the wireless network to which the user is currently connected, respectively. In an actual scenario, the two means may be combined. That is, the frequent location of the user may be identified based on the current geographic location of the user and the BSSID of the wireless network to which the user is currently connected. A specific method of identifying user location may refer to the above description, and will not be repeatedly described herein.

An embodiment of the present disclosure may further provide an apparatus to identify user location, including: a clustering module, a first identification module, a first acquisition module, and a first determination module.

The clustering module may be arranged to cluster the plurality of geographic locations of the user acquired in advance in order to obtain a cluster center of each type of the geographic locations.

The first identification module may be arranged to identify a frequent location corresponding to each cluster center.

The first acquisition module may be arranged to acquire a current geographic location of the user.

The first determination module may be arranged to determine the cluster center matching the current geographic location and to take the frequent location corresponding to the cluster center matching the current geographic location as a current location of the user.

In an embodiment, the first identification module may be specifically arranged to count the number of dormancies of the user's electronic device meeting predefined dormant duration at a location matching each cluster center within a predefined period of sample collection. Based on the counted number of dormancies, the frequent location corresponding to each cluster center may be identified.

In an embodiment, the apparatus may further include: a second acquisition module, a second determination module, and a set establishment module.

The second acquisition module may be arranged to acquire the BSSID of the wireless network to which the user's electronic device is connected at each of the geographic locations.

The second determination module may be arranged to determine the cluster center matching each of the geographic locations.

The set establishment module may be arranged to add the BSSID correspondingly into the locations set corresponding to the matched cluster center.

In an embodiment, the apparatus may further include a second identification module.

The second identification module may be arranged to count the number of dormancies of the user's electronic device meeting the predefined dormant duration at the location matching each location set and to identify the frequent location corresponding to each location set based on the counted number of dormancies.

In an embodiment, the apparatus may further include: a third acquisition module and a third determination module.

The third acquisition module may be arranged to acquire the BSSID of the wireless network to which the user is currently connected.

The third determination module may be arranged to determine the location set matching the BSSID of the wireless network to which the user is currently connected and to take the frequent location corresponding to the matched location set as the current location of the user.

In an embodiment, an apparatus of identifying user location may further be provided. The apparatus may be integrated in an electronic device. The electronic device may be a mobile internet device (such as a smart phone and a tablet computer), a smart wearable device (such as a smart watch), or other smart electronic devices.

Figure 4:
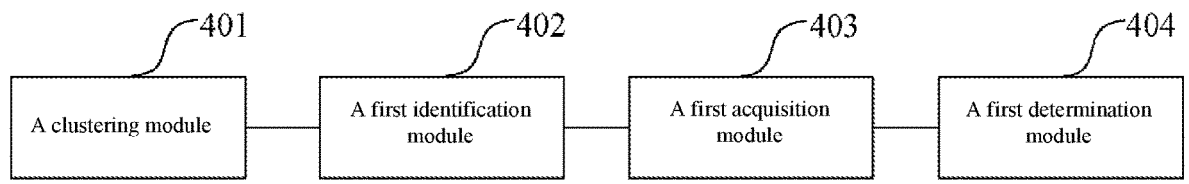
FIG. 4 is a structural schematic view of an apparatus of identifying user location according to an embodiment of the present disclosure.

As shown in FIG. 4, the apparatus of identifying user location may include: a clustering module 401, a first identification module 402, a first acquisition module 403, and a first determination module 404.

The clustering module 401 may be arranged to cluster the plurality of geographic locations of the user acquired in advance in order to obtain the cluster center of each type of the geographic locations.

The first identification module 402 may be arranged to identify the frequent location corresponding to each cluster center.

The acquisition module 403 may be arranged to acquire the current geographic location of the user.

The first determination module 404 may be arranged to determine the cluster center matching the current geographic location and to take the frequent location corresponding to the cluster center matching the current geographic location as the current location of the user.

In some embodiments, the first identification module 402 may be arranged to count the number of dormancies of the user's electronic device meeting the predefined dormant duration at the location matching each cluster center within the predefined period of sample collection and to identify the frequent location corresponding to each cluster center based on the counted number of dormancies.

Figure 5:
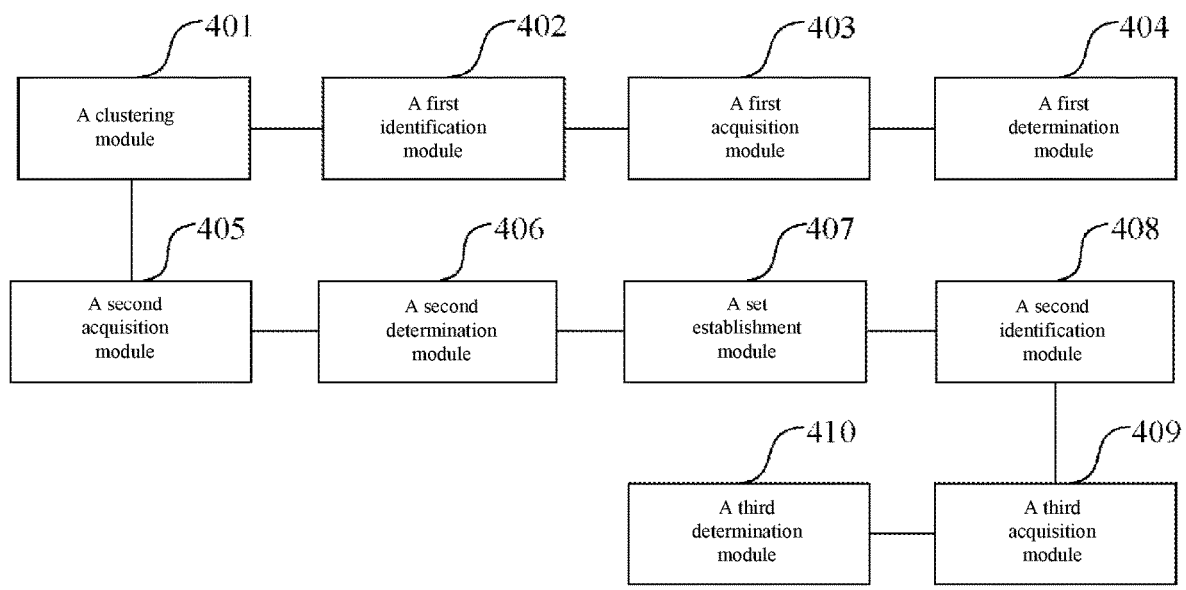
FIG. 5 is another structural schematic view of the apparatus of identifying user location according to an embodiment of the present disclosure.

In some embodiment, as shown in FIG. 5, the apparatus of identifying user location provided by the embodiment of the present disclosure may further include: a second acquisition module 405, a second determination module 406, and a set establishment module 407.

The second acquisition module 405 may be arranged to acquire the BSSID of the wireless network to which the user's electronic device is connected at each geographic location.

The second determination module 406 may be arranged to determine the cluster center matching each graphic location.

The set establishment module 407 may be arranged to add the BSSID correspondingly into the location set corresponding to the matched cluster center.

In some embodiments, the apparatus provided by the present embodiment may further include: a second identification module 408.

The second identification module 408 may be arranged to count the number of dormancies of the user's electronic device meeting the predefined dormant duration at the location matching each location set within a predefined period of sample collection and to identify the frequent location corresponding to each location set based on the counted number of dormancies.

In some embodiments, the apparatus provided by the present embodiment may further include: a third acquisition module 409 and a third determination module 410.

The third acquisition module 409 may be arranged to acquire the BSSID of the wireless network to which the user is currently connected.

The third determination module 410 may be arranged to determine the location set matching the BSSID of the wireless network to which the user is currently connected and to take the frequent location corresponding to the matched location set as the current location of the user.

According to the present embodiment, in an electronic device, the clustering module 401 may cluster a plurality of geographic locations acquired in advance to obtain a cluster center of each type of geographic locations. The first identification module 402 may identify the frequent location corresponding to each cluster center. After the first acquisition module 403 acquires the current geographic location of the user, the first determination module 404 may determine the cluster center matching the current geographic location and may take the frequent location corresponding to the matched cluster center as the current location of the user. According to the present embodiment, by clustering the geographic locations, the electronic device may learn the geographic location of the samples and the frequent locations. Based on the learning, the frequent location at which the user is currently located may be identified. The entire learning and identification processes may be performed locally in the electronic device without interaction with a network. Therefore, upload of sensitive information of the user without authorization may not be an issue, and security concerns of the user may be reduced. The identified location of the user may provide an effective reference for decisions of location-based intelligent services.

During an actual implementation, each of the above modules may be realized in an independent entity, or may be combined and realized in a same or more than one entity. Specific implementations of the above modules may refer to the above embodiments, and will not be repeatedly described herein.

Embodiments of the present disclosure may further provide an electronic device, including: a processor, a non-transitory memory, a display screen, and a control circuit.

The processor may be electrically connected to the non-transitory memory, the display screen, and the control circuit. The non-transitory memory may be arranged to store instructions and data. The display screen may be arranged to display information. The control circuit may be arranged to control the display screen to display information. The processor may be arranged to perform following operations.

A plurality of geographic locations of a user acquired in advance may be clustered, and a cluster center of each type of geographic locations may be obtained.

A frequent location corresponding to each cluster center may be identified.

A current geographic location of the user may be acquired.

The cluster center matching the current geographic location may be determined, and the frequent location corresponding to the cluster center matching the current geographic location may be taken as a current location of the user.

Figure 6:
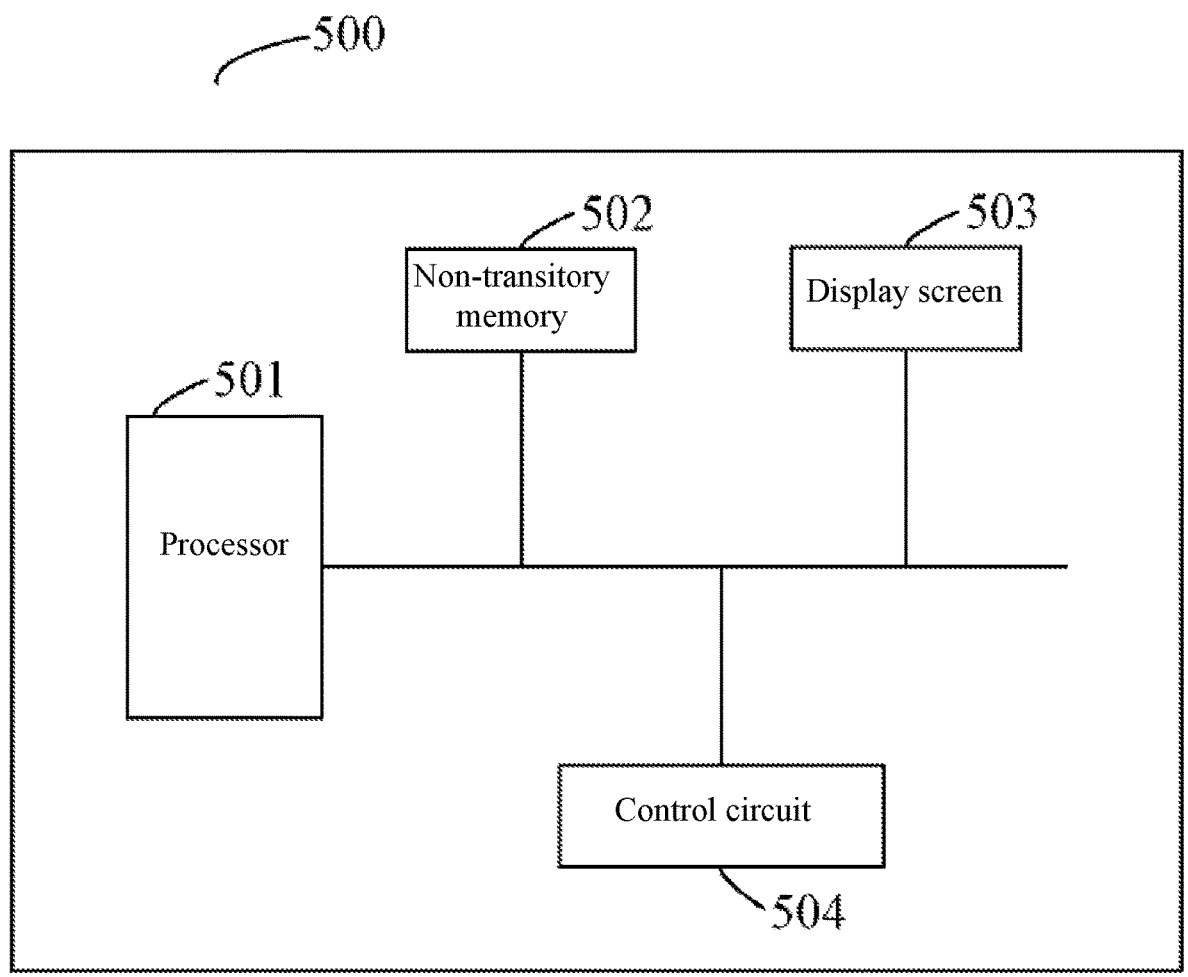
FIG. 6 is a structural schematic view of an electronic device according to an embodiment of the present disclosure.

In an embodiment, an electronic device may further be provided. The electronic device may be a smart phone, a tablet computer, or the like. As shown in FIG. 6, the electronic device 500 may include a processor 501, a non-transitory memory 502, a display screen 503, and a control circuit 504. The processor 501 may be electrically connected to the non-transitory memory 502, the display screen 503, and the control circuit 504, respectively.

The processor 501 may be a control center of the electronic device 500, and may use various interfaces and lines to connect various components of the entire electronic device. By running or loading application programs stored in the non-transitory memory 502, and by invoking the data stored in the non-transitory memory 502, the processor may execute various functions of the electronic device and process data, such that the electronic device may be monitored as a whole.

In the present embodiment, the processor 501 of the electronic device 500 may load instructions corresponding to one or more application program to the non-transitory memory 502. The one or more application program stored in the non-transitory memory 502 may be run by the processor 501 to achieve following functions.

A plurality of geographic locations of a user acquired in advance may be clustered, and a cluster center of each type of geographic locations may be obtained.

A frequent location corresponding to each cluster center may be identified.

A current geographic location of the user may be acquired.

The cluster center matching the current geographic location may be determined, and the frequent location corresponding to the cluster center matching the current geographic location may be taken as a current location of the user.

In some embodiments, when the plurality of geographic locations of the user acquired in advance are clustered to obtain the cluster center of each type of the geographic locations, the processor 501 may be arranged to perform operations of: applying the K-means algorithm, and using the plurality of geographic locations as a sample group, selecting a predefined number of geographic locations from the sample group randomly to be initial cluster centers for clustering, and obtaining the cluster center of each type of geographic locations.

In some embodiments, when identifying the frequent location corresponding to each cluster center, the processor 501 may be arranged to perform operations of: within a predefined period of sample collection, counting the number of dormancies of the user's electronic device meeting the predefined dormant duration at a location matching each cluster center, and identifying the frequent location corresponding to each cluster center based on the counted number of dormancies.

In some embodiments, when determining the cluster center matching the current geographic location, the processor 501 may be arranged to perform operations of: determining a distance between the current geographic location and each cluster center, and taking the cluster center having a shortest distance to the current geographic location as the cluster center matching the current geographic location.

In some embodiments, after acquiring the cluster center of each type of geographic locations, the processor 501 may be arranged to perform operations of: acquiring a BSSID of a wireless network to which the user's electronic device is connected at each geographic location; determining the cluster center matching each geographic location; and adding the BSSID correspondingly into a location set corresponding to the matched cluster center.

In some embodiment, after adding the BSSID correspondingly into a location set corresponding to the matched cluster center, the processor 501 may be arranged to perform operations of: within the predefined period of sample collection, counting the number of dormancies of the user's electronic device meeting the predefined dormant duration at a location matching each location set; and identifying the frequent location corresponding to each location set based on the counted number of dormancies.

In some embodiments, after determining the frequent location corresponding to each location set based on the counted number of dormancies, the processor 501 may be arranged to perform operations of: acquiring the BSSID of the wireless network to which the user is currently connected; determining the location set matching the BSSID of the wireless network to which the user is currently connected, and taking the frequent location corresponding to the matched location set as the current location of the user.

The non-transitory memory 502 may be arranged to store application programs and data. The application programs stored in the non-transitory memory 502 may include an instruction able to be executed by the processor. The application programs may form various functional modules. By running the application programs stored in the non-transitory memory 502, the processor 501 may perform various functions and process the data.

The display screen 503 may be arranged to display information input by the user or information provided for the user, and display various graphical user interfaces. The graphical user interfaces may include an image, a text, an icon, a video, and any combination thereof.

The control circuit 504 may be electrically connected to the display screen 503, and may control the display screen 503 to display information.

Figure 7:
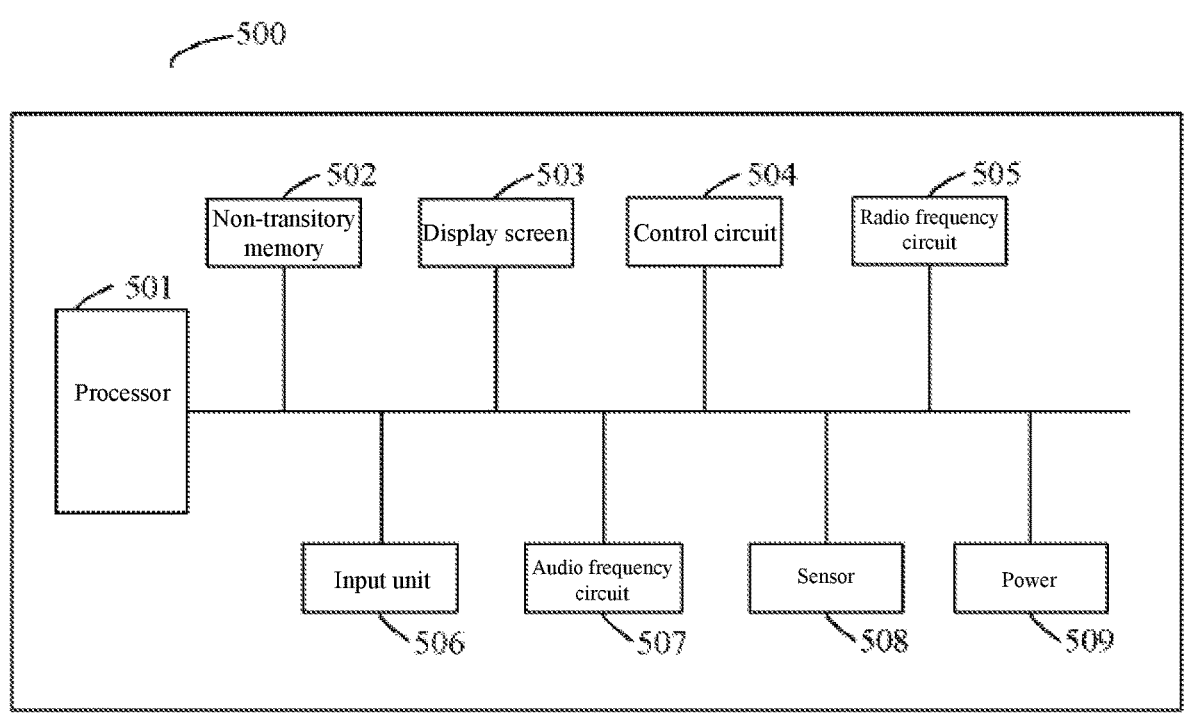
FIG. 7 is another structural schematic view of an electronic device according to an embodiment of the present disclosure.

In some embodiments, as shown in FIG. 7, the electronic device 500 may include: a radio frequency circuit 505, an input unit 506, an audio frequency circuit 507, a sensor 508, and a power 509. The processor 501 may be electrically connected to the radio frequency circuit 505, the input unit 506, the audio frequency circuit 507, the sensor 508, and the power 509, respectively.

The radio frequency circuit 505 may be arranged to send and receive a radio signal. Through radio communication, the radio frequency circuit 505 may generate wireless communication with a network device or other electronic devices and may send and receive signals with the network device or other electronic devices.

The input unit 506 may be arranged to receive input digits, character information or feature information of the user (such as a fingerprint), and generate signal input related to user setting and functional controls, such as a keyboard, a mouse, an operation stick, an optical or a track ball. The input unit 506 may include a fingerprint identification module.

The audio circuit 507 may provide an audio interface between the user and the electronic device through a loudspeaker and a microphone.

The sensor 508 may be arranged to collect external environmental information. The sensor 508 may include at least one sensor selected from the group consisting of an ambient light sensor, an acceleration sensor, and a gyro.

The power 509 may be arranged to supply power to each component of the electronic device 500. In some embodiments, the power 509 may be logically connected to the processor 501 through a power management system, such that recharging, discharging, power consumption, and other functions may be managed through the power management system.

Although not shown in FIG. 7, the electronic device 500 may further include a camera, a bluetooth module, or the like, which will not be described herein.

According to the electronic device provided by the embodiments of the present disclosure, a plurality of geographic locations acquired in advance may be clustered to obtain a cluster center of each type of geographic locations. A frequent location corresponding to each cluster center may be identified. After acquiring a current geographic location of a user, the cluster center matching the current geographic location may be determined, and the frequent location corresponding to the cluster center matching the current geographic location may be taken as the current location of the user. According to the present embodiment, by clustering the geographic locations, the electronic device may learn geographic location samples and the frequent locations. Based on the learning, the frequent location at which the user is currently located may be identified. The entire learning and identification processes may be performed locally in the electronic device without interaction with a network. Therefore, upload of sensitive information of the user without authorization may not be an issue, and security concerns of the user may be reduced. The identified location of the user may provide an effective reference for decisions of location-based intelligent services.

To be noted that, ordinary skilled in the related art shall understand that all or some operations of various methods as described in the above embodiments may be completed by instructing related hardware through a program. The program may be stored in a computer-readable non-transitory storage medium, such as a non-transitory memory of the electronic device, and the program may be executed by at least one processor in the electronic device. The execution may include operations of identifying the user location as described in the above embodiments. The non-transitory storage medium may include: a read only memory (ROM), a random access memory (RAM), a magnetic disc, or a compact disc.

According to the above embodiments of the present disclosure, the method of identifying user location, the apparatus, the non-transitory storage medium, and the electronic device may be described in details, and various functional modules thereof may be integrated into a processing chip, or may be physically present as independent components. Alternatively, two or more modules may be integrated into one module. The above integrated modules may be realized as hardware or realized as functional modules of software. In the present disclosure, specific embodiments are used to illustrate the principle and implementations of the present disclosure. The above embodiments are for the purposes of understanding the methods and essential concepts of the present disclosure. In addition, to the ordinary skilled in the related art, according to the concept of the present disclosure, specific implementations and the scope of application may be varied. To summarize, the present specification should not limit the scope of the present disclosure.

What is claimed is:
1. A method of identifying user location, comprising:
clustering a plurality of geographic locations of a user acquired in advance, and obtaining a cluster center of each type of geographic locations;

acquiring a BSSID of a wireless network to which an electronic device of the user is connected at each of the plurality of geographic locations;

determining the cluster center matching each of the plurality of geographic locations;

adding the BSSID correspondingly into a location set corresponding to the matched cluster center;

identifying a frequent location corresponding to each cluster center;

acquiring a current geographic location of the user; and determining the cluster center matching the current geographic location, and taking the frequent location corresponding to the cluster center matching the current geographic location as a current location of the user.

2. The method according to claim 1, wherein the clustering the plurality of geographic locations of the user acquired in advance, and the obtaining the cluster center of each type of the geographic locations comprises:

setting the plurality of geographic locations to be a sample group, selecting a predefined number of geographic locations randomly from the sample group to be initial cluster centers for clustering by applying a K-means algorithm, and obtaining the cluster center of each type of geographic locations.

3. The method according to claim 1, wherein the identifying the frequent location corresponding to each cluster center comprises:

within a predefined period of sample collection, counting a number of dormancies of the electronic device of the user meeting a predefined dormant duration at a location matching each cluster center; and identifying the frequent location corresponding to each cluster center based on the counted number of dormancies.

4. The method according to claim 3, wherein the determining the cluster center matching the current geographic location comprises:

determining a distance between the current geographic location and each cluster center, and taking the cluster center having a shortest distance to the current geographic location as the cluster center matching the current geographic location.

5. The method according to claim 1, wherein the method further comprises:

after the adding the BSSID correspondingly into the location set corresponding to the cluster center matching each of the plurality of geographic locations:

within the predefined period of sample collection, counting the number of dormancies of the electronic device meeting the predefined dormant duration at a location matching each location set; and identifying the frequent location corresponding to each location set based on the counted number of dormancies.

6. The method according to claim 5, wherein the method further comprises:

after identifying the frequent location corresponding to each location set based on the counted number of dormancies:

acquiring the BSSID of the wireless network to which the user is currently connected; and determining the location set matching the BSSID of the wireless network to which the user is currently connected, and taking the frequent location corresponding to the matched location set as the current location of the user.

7. A non-transitory storage medium, having one or more instruction stored therein, wherein the one or more instruction is executed by a processor to perform operations of:

acquiring a current geographic location of a user;

determining a cluster center matching the current geographic location according to a pre-stored mapping relation, wherein the pre-stored mapping relation comprises a plurality of geographic locations of the user, cluster centers corresponding to the plurality of geographic locations and frequent locations corresponding to the plurality of geographic locations; the pre-stored mapping relation is obtained by acquiring the plurality of geographic locations of the user, clustering the plurality of geographic locations of the user, obtaining a cluster center of each type of geographic locations and identifying a frequent location corresponding to each cluster center;

acquiring a BSSID of a wireless network to which an electronic device of the user is connected at each of the plurality of geographic locations;

determining the cluster center matching each of the plurality of geographic locations; and adding the BSSID correspondingly into a location set corresponding to the matched cluster center; and taking the frequent location corresponding to the matched cluster center as a current location of the user, wherein the frequent location corresponding to each cluster center is identified by:

counting a number of dormancies of the electronic device of the user having dormant duration meeting a predefined value at a location matching each cluster center within a predefined period of sample collection; and identifying the frequent location corresponding to each cluster center based on the counted number of dormancies.

8. The non-transitory storage medium according to claim 7, wherein the one or more instruction is further executed by the processor to perform operations of:

counting the number of dormancies of the electronic device having the dormant duration meeting the predefined value at a location matching each location set, within the predefined period of sample collection; and identifying the frequent location corresponding to each location set based on the counted number of dormancies.

9. The non-transitory storage medium according to claim 8, wherein the one or more instruction is further executed by the processor to perform operations of:

acquiring the BSSID of a wireless network to which the user is currently connected; and determining the location set matching the BSSID of the wireless network to which the user is currently connected, and taking the frequent location corresponding to the matched location set as the current location of the user.

10. An electronic device, comprising: a processor, a non-transitory memory, a display screen, and a control circuit, wherein the processor is electrically connected to the non-transitory memory, the display screen, and the control circuit;

the non-transitory memory is arranged to store an instruction and data;

the display screen is arranged to display information;

the control circuit is arranged to control the display screen to display information; and the processor is arranged to perform operations of:

cluster a plurality of geographic locations of a user acquired in advance, and obtain a cluster center of each type of geographic locations;

acquire a BSSID of a wireless network to which the electronic device is connected at each of the plurality of geographic locations;

determine the cluster center matching each of the plurality of geographic locations;

add the BSSID correspondingly into a location set corresponding to the matched cluster center;

identify a frequent location corresponding to each cluster center by determining a state of the electronic device;

acquire a current geographic location of the user; and determine the cluster center matching the current geographic location, and taking the frequent location corresponding to the matched cluster center as a current location of the user.

11. The electronic device according to claim 10, wherein, during the clustering the plurality of geographic locations of the user acquired in advance, and obtaining the cluster center of each type of the geographic locations, the processor is further arranged to:

use the plurality of geographic locations as a sample group, and select a predefined number of geographic locations from the sample group randomly to be initial cluster centers for clustering by applying a K-means algorithm, such that the cluster center of each type of geographic locations is obtained.

12. The electronic device according to claim 10, wherein, during the clustering the plurality of geographic locations of the user acquired in advance, and obtaining the cluster center of each type of the geographic locations, the processor is further arranged to:

eliminate a geographic location sample when a distance between the geographic location sample and any cluster center is greater than a predefined value.

13. The electronic device according to claim 11, wherein, during the identifying the frequent location corresponding to each cluster center, the processor is further arranged to:

count a number of dormancies of the electronic device of the user meeting predefined dormant duration at a location matching each cluster center, within a predefined period of sample collection; and identify the frequent location corresponding to each cluster center based on the counted number of dormancies.

14. The electronic device according to claim 13, wherein, during the determining the cluster center matching the current geographic location, the processor is further arranged to:

determine a distance between the current geographic location and each cluster center, and take the cluster center having a shortest distance to the current geographic location as the cluster center matching the current geographic location.

15. The electronic device according to claim 10, wherein the processor is further arranged to:

after adding the BSSID correspondingly into the location set corresponding to the matched cluster center:

count the number of dormancies of the electronic device meeting the predefined dormant duration at a location matching each location set, within the predefined period of sample collection; and identify the frequent location corresponding to each location set based on the counted number of dormancies.

16. The electronic device according to claim 15, wherein, after identifying the frequent location corresponding to each location set based on the counted number of dormancies, the processor is further arranged to:

after identifying the frequent location corresponding to each location set based on the counted number of dormancies:

acquire the BSSID of the wireless network to which the user is currently connected; and determine the location set matching the BSSID of the wireless network to which the user is currently connected, and take the frequent location corresponding to the matched location set as the current location of the user.

* * * * *